United States Patent [19]

Vaidya

[11] Patent Number: 4,596,420
[45] Date of Patent: Jun. 24, 1986

[54] BUILT-IN VEHICLE CHILD'S SEAT ASSEMBLY

[76] Inventor: Rohit Vaidya, 10980 S.W. 47 St., Miami, Fla. 33165

[21] Appl. No.: 632,386

[22] Filed: Jul. 19, 1984

[51] Int. Cl.$^4$ .............................................. A47C 15/00
[52] U.S. Cl. .................................... 297/233; 297/238; 297/254; 297/488; 297/398; 297/325
[58] Field of Search .............. 297/238, 250, 254, 256, 297/488, 398, 406, 233, 433, 321, 325

[56] References Cited

U.S. PATENT DOCUMENTS

| | | | |
|---|---|---|---|
| 2,719,577 | 10/1955 | Eyman | 297/391 |
| 2,966,201 | 12/1960 | Strahler | 297/238 |
| 3,837,670 | 9/1974 | Hilyard | 297/488 X |
| 3,951,450 | 4/1976 | Gambotti | 297/238 |
| 4,205,877 | 6/1980 | Ettridge | 297/321 |
| 4,339,149 | 7/1982 | Nakao et al. | 297/250 |
| 4,429,916 | 2/1984 | Hyde et al. | 297/488 |

FOREIGN PATENT DOCUMENTS 1512370  6/1978  United Kingdom ................ 297/250

*Primary Examiner*—Francis K. Zugel

[57] ABSTRACT

A child's seat assembly securable, preferably within the seat back of the backseat of a vehicle. This invention includes a molded seal and frame which is interconnectable between the vehicle's seat back support structure. The molded seat is releasably positionable, generally within the perimeter of the frame, which is preferably tubular. The frame fits either between two seat back portions or at one end of a seat back portion when installed as original vehicle equipment. When installed as an after-market accessory, the vehicle's existing seat back must be modified to accommodate installation of the frame to the support structure of the vehicle. This assembly includes two lateral head support panels, a torso containment panel, and, preferably, a foot support panel. The two head support panels are generally vertically hinged, the hinges mounted along either upper portion of the frame, while the foot support is hinged along a lower transverse cross member of the frame. The torso containment panel is connected along opposing transverse points of the edges of the molded seat by telescoping arms. By these hinged mountings of the head support and foot support panels, and telescopic mountings of the torso containment panel, the assembly has a lockable open "in-use" position and a more compact lockably closed position. The torso containment panel may also be pivotable upward for increased ease of a baby's entrance and egress. Seat recline adjustments may be included as well as spring-loaded hinges for automatic openings of hinged panels.

11 Claims, 13 Drawing Figures

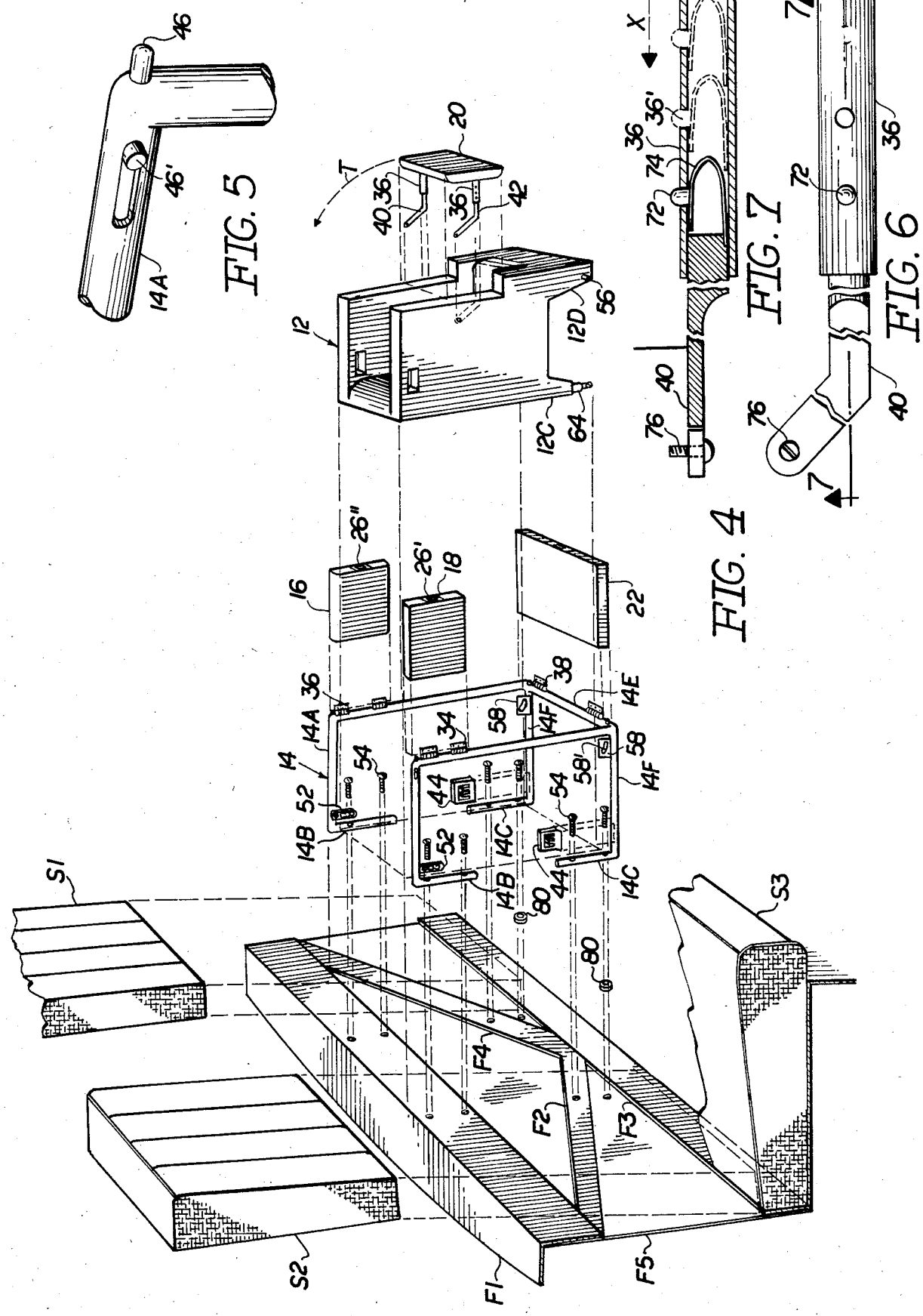

BUILT-IN VEHICLE CHILD'S SEAT ASSEMBLY

BACKGROUND OF THE INVENTION

This invention relates generally to child car seats to securely restrain a child in an automobile, and more particularly, to a built-in, permanently installed or installable child's car seat.

With the increased concern for, and legislation dealing with, safety of children in a vehicle, several patents have issued disclosing various forms of supportive and protective and protective seats for children which are adapted to be strapped or otherwise secured onto an existing vehicle seat. Such inventions are disclosed in U.S. Pat. Nos.: 3,709,558; 4,205,877; 4,274,674; and 4,402,548.

These above-referenced child's seat inventions are intended to be easily and conveniently secured in and removed from a vehicle. However, when installed therein, they create a substantial obstruction in the seat whereon they are attached. Additionally, the restraining means, whether by existing vehicle seat belts, or by included straps or other fastening means, are cumbersome to release and disengage.

Prior art also discloses children's seats which appear to be interconnected to the floor structure of the vehicle. Such inventions are disclosed in U.S. Pat. Nos. 3,515,431 and 4,183,580. However, because of their unique structure and means of interconnection to the vehicle, these inventions have little specific relationship to applicant's invention.

Applicant is also aware of a specific and unique design for a child's safety chair as shown in U.S. Pat. No. 3,964,787. Because this disclosure includes no description of a means for interconnection or interattachment to any portion of the vehicle, it is presumed that it is intended to simply rest on a vehicle's seat, relying on the unique protective shape of the seat and retaining members disclosed therein.

A complex and apparently cumbersome passive child restraint system, not including a specific seat design, is disclosed in U.S. Pat. No. 4,256,329. Likewise, this invention is unrelated specifically to children's seat design.

Lastly, applicant is aware of a vehicle seat pad for use by children, U.S. Pat. No. 3,707,008, wherein a plurality of integral sections, each being adjustable in height, enable children to sit at substantially normal eye level. This invention, however, has no relationship to children's safety or containment within the vehicle.

The present invention discloses a uniquely shaped children's safety seat which is intended to be permanently installed or installable within the upright back portion, preferably, of the back seat of a vehicle. This invention may be installed into existing vehicles after modification of the seat back, or may more easily be installed as original equipment when the vehicle is manufactured. In addition to offering a permanently secured protective child's seat for use, the present invention, in its folded closed position, is considerably less obtrusive to other passengers in the vehicle.

BRIEF SUMMARY OF THE INVENTION

The present invention is that of a child's safety seat assembly to be secured to the vehicle's structure that exists behind the seat back of a seat in that vehicle. Included in the invention is a frame which is connectable to the vehicle's seat back support structure, and replaces a portion of the seat back. Connectable to the frame after installation is a molded seat releasably positionable generally within the perimeter of the frame, which frame is preferably tubular in construction. The portion of the seat back to be removed to accommodate the frame may be either along a midpoint of the existing seat or at either end of the existing seat back. When installed as original vehicle equipment, the seat back may easily be redesigned to accommodate the frame. When installed as an after-market accessory, the vehicle's existing seat back must be modified by removal of a portion of that seat back to allow access of the frame to the support structure for fastening thereto or incorporated into a prefabricated seat back which replaces that existing in the vehicle. The assembly also includes two lateral head support panels, a torso containment panel, and, preferably, a foot support panel. The head support panels and foot support panel are hinge mounted to be folded out for use and then back to a "closed position" for increased compactness. The torso containment panel telescopes outwardly to accommodate a child placed into the molded seat and back inwardly for storage. Each of these panel dual positions provides storage compactness and less intrusion on other passengers when the seat assembly is not in use. The molded seat is preferably, reclinable within the frame and may also include spring mountings for increased child comfort and/or entertainment for the child therein.

It is therefore an object of this invention to provide a child's seat which is permanently installed into a vehicle along the seat back, preferably, of the back seat of a vehicle.

It is another object of this invention to provide a child's seat which replaces a portion of the back seat and which thereby is connectable directly to the vehicle's body structure behind the seat back.

It is still another object of this invention to provide a child's seat which includes a closed or stored position when not in use to minimize the vehicle's space intrusion.

It is yet another object of this invention to provide a child's seat which will substantially assist in protecting a child placed therein from injury during a collision.

And still another object of this invention is to provide a child's seat which is adjustable to a reclined position.

In accordance with these and other objects which will become apparent hereinafter, the instant invention will now be described with reference to the accompanying drawings in which:

BRIEF DESCRIPTION OF THE DRAWINGS

FIG. 4 is an exploded perspective view of the invention and the vehicle's back seat and seat back support structure.

FIG. 5 is a perspective view of the means for locking open the lateral head support panels.

FIG. 6 is a side elevation view of the telescoping interconnection means between the molded seat and the torso containment panel.

FIG. 7 is a section view in the direction of arrows 7—7 in FIG. 6.

DESCRIPTION OF PREFERRED EMBODIMENT OF THE INVENTION

Figure 1:
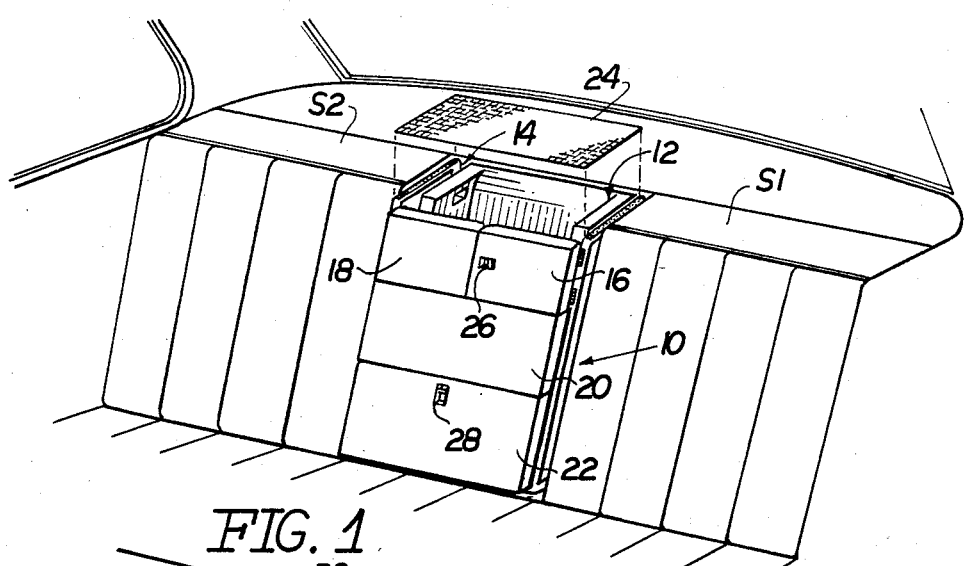
FIG. 1 is a perspective, partially exploded, view of the invention in the stored position installed into the seat back of the back seat of a vehicle.

Referring now to the drawings and particularly to FIG. 1, the baby seat assembly is shown generally at 10 and in a closed or stored position and includes a molded seat 12 positioned within a tubular frame 14. The tubular frame 14 replaces a portion of the seat back, fitting between seat back portions S1 and S2. Seat bottom S3 is also shown. This invention also includes lateral head support panels 16 and 18, a torso containment panel 20, and preferably, a foot support panel 22. Also optional and preferred, is the closure panel 24 which is held in place by Velcro to provide a finished appearance, matching the seat back portions S1 and S2.

Figure 2:
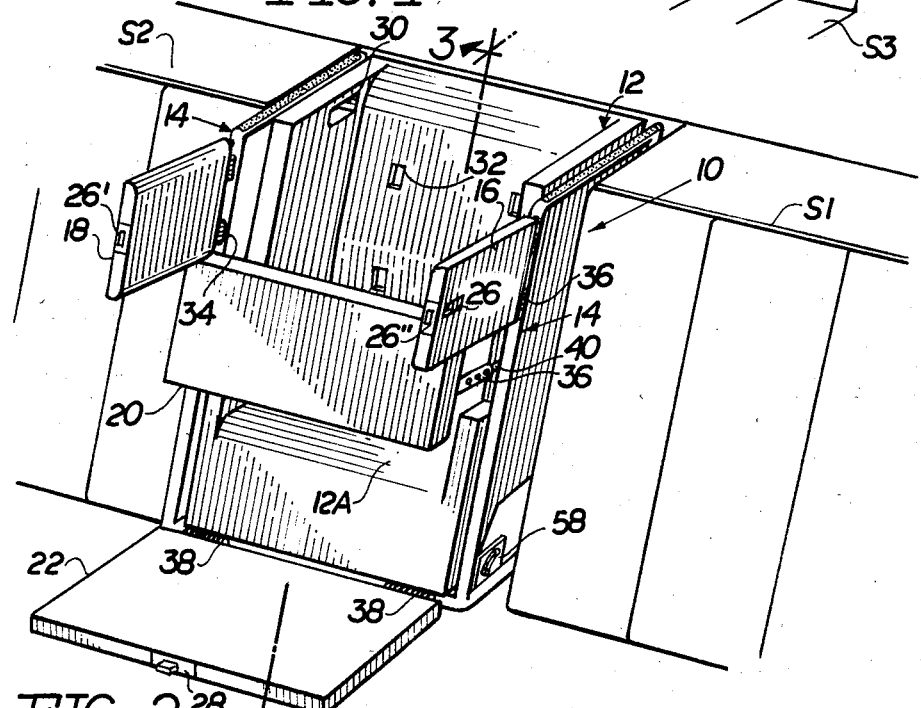
FIG. 2 is a perspective view of the invention in an open position for use.
Figure 3:
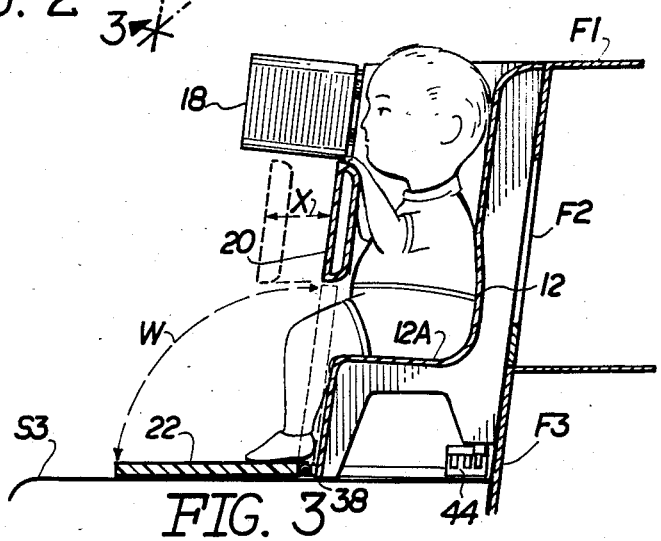
FIG. 3 is a side elevation section view of the invention in the direction of arrows 3—3 in FIG. 2 and with a child seated therein.

Referring to FIGS. 2 and 3, the seat assembly 10 is shown in an open, ready to use position. Lateral head support panels 16 and 18, spring hinged at 34 and 36, automatically swing open when latch 26, which interengages between 26' and 26", is slid open. Torso containment panel 20 telescopes outward in the direction of arrow X and is pivotable upward by telescoping means 36 and 40 described below to allow positioning of a baby in the molded seat 12 resting on molded seat portion 12A.

Foot support panel 22 is also mounted on spring hinges 38, swinging that panel downward in the direction of arrow W into the open position automatically when latch 28 is slid open. Grippable aperture handles 30 formed into the molded seat 12, assist in repositioning the molded seat 12 in relation to the frame 14 and also for completely removing the molded seat 12 for cleaning. Apertures 32, also formed into the molded seat, provide points of attachment for safety seat belts.

Referring also to FIG. 4, a typical vehicle's seat back support structure includes an upper L-section transverse structure F1, diagonal structure members F2 and F4 which stiffen the main structural panel F5, and a lower L-section transverse structure F3. The tubular frame 14 includes two generally "C"-shaped portions as shown spaced apart and connected by frame transverse member 14E. Frame portions 14B and 14C include attachment apertures adapted to allow securing the frame 14 to this structure. Spacers 80 may be required to accommodate surface contour variations. Lateral head support panels 16 and 18 and foot support panel 22 are preferably hinge connected to the frame 14 as shown.

The torso containment panel 20 is connected to the molded seat by telescoping members 36 which are lockably movable in the direction of arrow X in FIG. 7. Also referring to FIG. 6, the outer telescoping member 36 is lockable at particular points by clip 74, including tip 72, which, when squeezed inwardly, positions tip 72 inside telescoping member 36 sufficiently so that the telescoping member 36 may then be repositioned inwardly or outwardly along arms 40 and relocked into another aperture 36'. Arm 40 is pivotally connected to the molded seat by bolts 76 which allow pivoting the torso containment panel 20 upward in the direction of arrow T in FIG. 4 to assist in placing in and removing a baby from the seat assembly 10.

Figure 11:
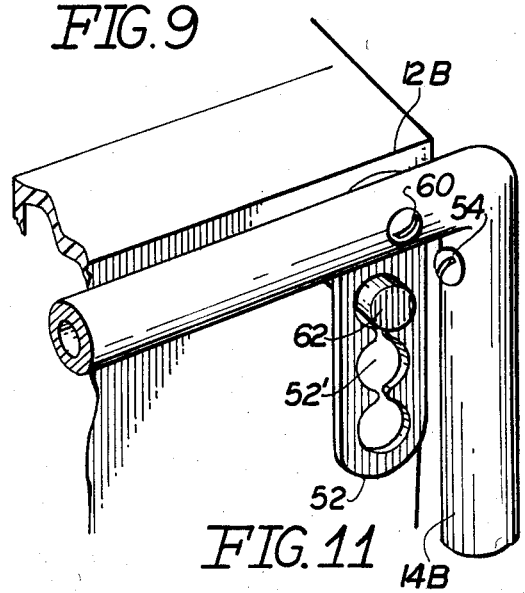
FIG. 11 is a perspective view of the upper adjustable interconnection between molded seat and frame.
Figure 10:
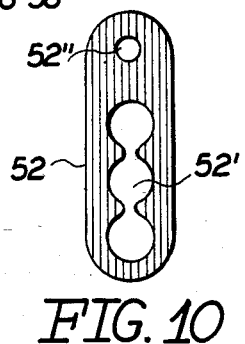
FIG. 10 is a side elevation view of the upper interconnecting bracket between molded seat and frame.

Still referring to FIG. 4, the molded seat 12 is releasably connectable to the frame 14 at three frame portions 44, 52, and 58. At frame portion 52, as best seen in FIGS. 10 and 11, pivotally bolted to frame portion 14B, through hole 52" by bolt 60, the elongated frame portion 52 also includes a plurality of overlapping, and thusly, connected, circular apertures 52' therethrough. Pin 62, plunger mounted for laterally outward spring biased translation in the molded seat portion 12b, interengages through one circular aperture 52' at a time to provide fixed support for that corner 12b of the molded seat 12. To release this interengagement, pin 62 is manually depressed against outward spring bias (not shown), repositioned adjacent another circular aperture 52, then released.

Figure 12:
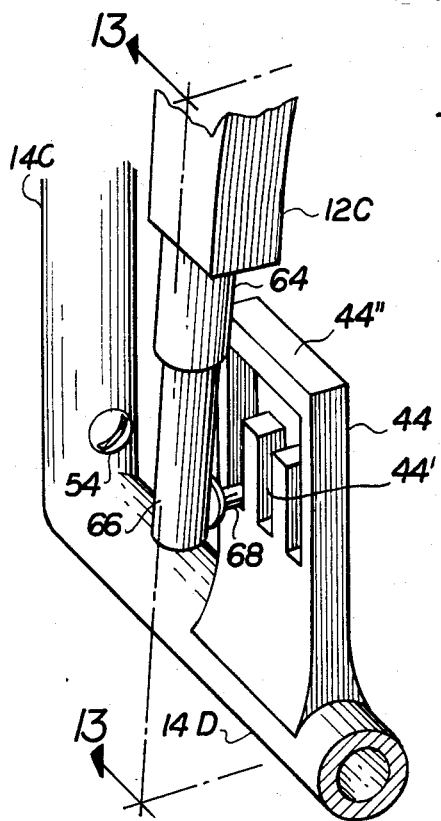
FIG. 12 is a perspective view of the lower adjustable interconnection between molded seat and frame.
Figure 13:
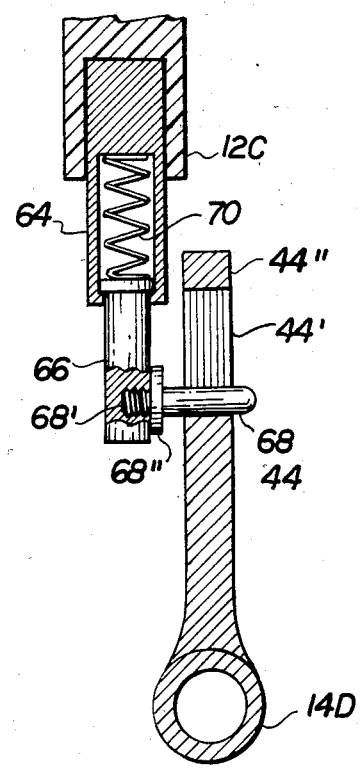
FIG. 13 is a section view in the direction of arrows 13—13 in FIG. 11.

Also referring to FIGS. 12 and 13, pin 68 is threadably engaged into spring plunger 66 by pin 68 threaded portion 68'. Knurled shoulder 68" allows manual disengagement. Spring plunger 66, compressably mating against spring 70 in retainer 64, which is fixed in molded seat portion 12c, provides some degree of isolation from the vehicle road impact or some slight means for rocking the molded seat 12 to entertain a baby. Slotted bracket 44, connected to the frame portions 14D, also provide adjustably restrained and releasable interengagement between frame 14 and molded seat 12. Pin 68 matably slides into a selected slot 44' in slotted bracket 44. Choice of a particular slot 44' determines fore-aft supportive positioning of pin 68, and consequently, like positioning of molded seat portion 12C. The top portion 44' of slotted bracket 44 services as one ultimate restraint of seat 12 against pin 68 in the event of a collision.

Figure 8:
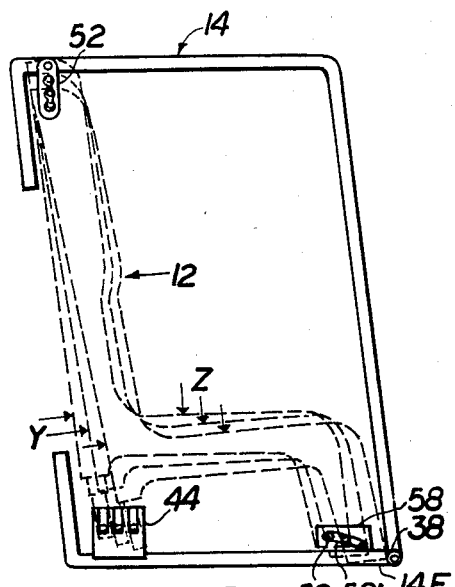
FIG. 8 is a side elevation view of the invention showing the molded seat in phantom to demonstrate adjustability of the molded seat in the frame.

Referring still to FIG. 4, as well as FIGS. 2 and 8, molded seat portion 12D is releasably connectable to the frame at slotted brackets 58 by interengagement between spring plunger pins 56 in slot 58'. Similar to pin 62 in FIG. 1 pin 56 is also plunger mounted into molded seat portion 12D as shown.

Adjustable reclining geometry of the molded seat is shown primarily in FIG. 8. With the molded seat 12 releasably, adjustably mounted within the frame 14 as previously discussed, by depressing pin 62, the molded seat 12 may be repositioned in the frame 14 in the direction of arrows Y and Z. When another angular alignment is achieved, plunger pin 62 is released into the appropriate aligned, circular aperture 52'.

Figure 9:
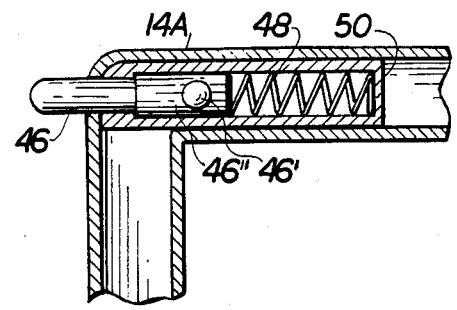
FIG. 9 is a centerline section view of FIG. 5.

To retain lateral head support panels 16 and 18 in an open position, referring to FIGS. 5 and 9, frame portions 14A include spring-biased plunger pins 46 mounted for lateral translation therein and, which protrude out through the frame portions 14A as shown. Spring 48, acting between housing 52 and plunger boss 46", maintain outward positioning of the plunger 46. Handle portion 46' allows manual depression of the plunger 46, which is insertable into a mating hole in each hinged edge of the lateral head support panels 16 and 18 (not shown). This same arrangement may also be incorporated into frame portions 14F as seen in FIGS. 4 and 8 to also render the foot support panel 20 lockably open.

Although the inventor's preferred installation would be approximately at the center of the seat back as best shown in FIGS. 1 and 4, the seat assembly may also be installed anywhere along the length of the rear seat seat back or within the vehicle's front seat seat back and be fully within the intended bounds of the invention.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to enbrace any and all equivalent apparatus and articles.

What is claimed is:

1. A child's seat assembly for integral installation within a removed portion of a vehicle's seat back comprising:
    a frame connectable to the vehicle's structure behind the removed portion of the seat back;
    a molded seat connectable to said frame;
    two lateral opposing protective head panels hinge connected along their generally upright outer margins to opposing upper portions of said seat assembly;
    said head panels having an open spaced apart position and a closed position wherein the exposed surfaces of said head panels are aligned one to another and with the exposed surface of the seat back, the inner margins of each said head panel adjacent one to another;
    a torso containment panel; and
    telescopic mounting means for connecting said torso containment panel to said seat assembly in a generally upright position;
    said torso containment panel having an open position wherein said torso containment panel is forwardly disposed in relation to the exposed surface of the seat back and a closed position wherein the exposed surface of said torso containment panel is generally aligned with the exposed surface of the seat back;
    in said closed positions, said head panels and said torso containment panel adapted to form a continuous seat back with adjacent seat back portions for use.

2. A child's seat assembly as set forth in claim 1, wherein:
    said frame includes a matched pair of generally "C" shaped rigid members laterally disposed in spaced apart and generally upright relation by a transverse cross member rigidly connected therebetween;
    said "C" shaped members opening rearwardly against, and adapted to be secured to, the vehicle's structure behind the seat back.

3. A child's seat assembly as set forth in claim 2, further comprising:
    a footrest panel hinge connected along one edge to said cross member;
    said cross member connected to and between the lower forward corner of each said "C" shaped member;
    said footrest panel having an open generally horizontal position adjacent the top surface of the vehicle's seat bottom and a closed position wherein the exposed surface of said footrest panel is generally aligned with the exposed surface of the seat back.

4. A child's seat assembly as set forth in claim 1, wherein:
    said molded seat is removable from said frame.

5. A child's seat assembly as set forth in claim 1, wherein:
    said head panels and said footrest panel are said hinge connected to said frame;
    said torso containment panel is said telescopically connected to said molded seat.

6. A child's seat assembly as set forth in claim 1, further comprising:
    means for reclining said molded seat in said frame.

7. A child's seat assembly as set fort in claim 3, further comprising:
    first locking means for releasably holding said two head panels in said closed position;
    second locking means for releasably holding said two head panels in said opposing open position;
    third locking means for releasably holding said footrest panel in said closed position;
    fourth locking means for releasably holding said footrest panel in said open position; and
    spring means included in said hinge connectors for automatically swinging said head panels and said footrest panel from said closed positions to said open positions when said first and third locking means are released.

8. A child's seat assembly as set forth in claim 1, further comprising:
    spring mounting means between said frame and said molded seat for cushioning and rocking said molded seat in said frame.

9. A child's seat assembly for a vehicle comprising:
    a frame connectable to the vehicle's structure behind a portion of the seat back of one of the vehicle seats;
    a molded seat connectable to said frame;
    two lateral protective head panels hinge connected along their upright outer margins adjacent the upper portion of said seat assembly;
    a torso containment panel;
    telescopic mounting means for connecting said torso containment panel in an upright position to said seat assembly such that said torso containment panel is adjustably positionable inwardly and outwardly in relation to said seat assembly;
    said telescopic mounting means connected at a midpoint of said seat assembly;
    a footrest panel hinge connected to said seat assembly along a transverse margin of said footrest panel such that said footrest panel will swing from a closed generally upright position to an open generally horizontal position adjacent the vehicle's seat bottom.

10. A child's seat assembly as set forth in claim 9, further comprising:
    first locking means for releasably holding said two lateral protective head panels generally transversely in a closed position;
    second locking means for releasably holding said two lateral protective head panels generally forwardly in an open position for use;
    third locking means for releasably holding said footrest panel in said cloed generally upright position;

fourth locking means for releasably holding said footrest panel in said open generally horizontal position for use; and spring means included in said hinge connectors for automatically swinging said two lateral protective head panels and said footrest panel from said closed positions to said open positions when said first and third locking means are released.

11. A child's seat assembly as set forth in claim 9, further comprising:

spring mounted means between said frame and said molded seat for cushioning and rocking said mold seat in said frame.

* * * * *